[11] 3,789,656
[45] Feb. 5, 1974

Miller

[54] RECTILINEAR ACOUSTICAL TRANSDUCER INSPECTION APPARATUS

[75] Inventor: Darrow L. Miller, Los Angeles, Calif.

[73] Assignee: North American Rockwell Corporation, El Segundo, Calif.

[22] Filed: July 7, 1972

[21] Appl. No.: 269,660

[52] U.S. Cl. .............................. 73/71.5 U, 73/67.8 S
[51] Int. Cl. ............................................ G01n 29/00
[58] Field of Search ...... 73/67.5, 67.6, 67.7, 67.8 S, 73/62.9, 71.5 U

[56] References Cited
UNITED STATES PATENTS

| | | | |
|---|---|---|---|
| 3,541,840 | 11/1970 | Phelan | 73/71.5 U |
| 3,628,374 | 12/1971 | Laudien | 73/67.8 S |
| 3,678,737 | 7/1972 | Miller | 73/71.5 U |

Primary Examiner—Richard C. Queisser
Assistant Examiner—Arthur E. Korkosz
Attorney, Agent, or Firm—Francis X. LoJacono, Sr.; Charles F. Dischler; L. Lee Humphries

[57] ABSTRACT

A rectilinear acoustical transducer and inspection apparatus for use as a non-destructive testing device, whereby workpieces such as structural stiffeners relating to aircraft and the like are inspected for defects or flaws. The apparatus comprises a carriage having rollers mounted therein for direct vehicular contact with the rib portion of the workpiece, whereby the carriage can transverse rectilinearly thereon and including an acoustical transducer pivotably mounted to the carriage having a locomotive means attached thereto by which the transducer is oscillated about its pivot point effecting a walking action to be imparted along the rib, thereby providing the necessary rectilinear motion throughout the length of the rib for the total rapid inspection of the workpiece. The transducer is adapted to removably receive a dry adhesive couplant, which forms a driving mechanical bond and acoustical couple between the piezo-electrical element of the transducer and the workpiece surface.

13 Claims, 12 Drawing Figures

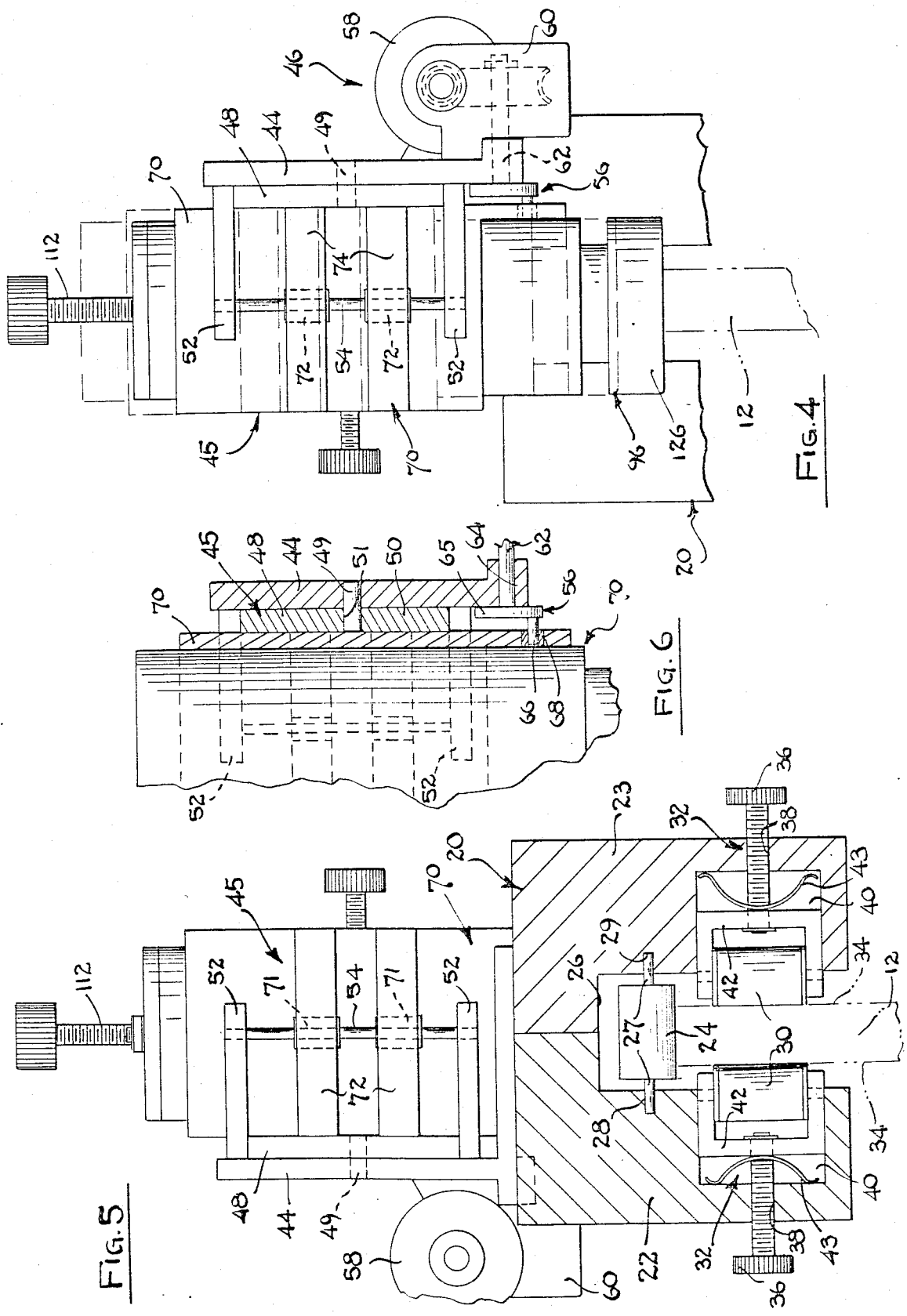

RECTILINEAR ACOUSTICAL TRANSDUCER INSPECTION APPARATUS

BACKGROUND OF THE INVENTION

1. Field of the Invention

This invention relates to an acoustical transducer used for ultrasonic inspection and more particularly to an ultrasonic inspection apparatus for inspecting structural stiffeners having rib sections provided thereon.

2. Description of the Prior Art

As is well known in the art various problems and difficulties have been encountered in providing an inspection tool having suitable means whereby a simple rapid inspection of a workpiece can be performed to locate structural defects. There are many varieties of inspection devices and methods widely practiced in modern industry today. Since such testing is of particular importance in high-speed aircraft and space vehicles, wherein use of composite panels, either laminates or sandwich-type, is wide-spread and critical support structures are required to withstand an above average specification prerequisite.

Heretofore it has been found most desirable to employ an ultrasonic probe to discover disbonds in composite structures in a nondestructive manner. Ultrasonic probes when employed with conventional electrical equipment produce a pulse of ultrasonic energy which is transmitted within the structure of the workpiece. The energizing signal is reflected in or attenuated upon coming into contact with any discontinuity within the workpiece, and this reflection or change in received signal amplitude is picked up by the probe and displayed by some conventional means such as an oscilloscope. The acoustical pulse is usually produced by the application of the piezoelectric effect. The piezoelectric effect is where certain materials of a crystalline structure (typically barrium titanate, lead zirconate, or lead metaniobate) are caused to physically vibrate on application of a voltage gradient thereto producing a pulse of ultrasonic energy. The crystal structure of the probe physically deforms and produces a mechanical pulse. The resultant acoustical pulse is transmitted into the workpiece and any discontinuities within the workpiece are detected by the reflection and/or attenuation of the returned signal.

The most common type of acoustical probe used for ultrasonic inspection has been particularly flat disc form. To effect the efficient transmission of the electrical pulse into the workpiece, an accurate sensing of the reaction, the flat disc probe typically requires the use of a liquid or a paste couplant which wets the workpiece surface and couples the probe and the test article together acoustically. The probe is then moved translationally across the workpiece surface in a sliding relationship therwith across the intervening film of couplant. Any defects or disbonds located within the workpiece are then detected by analysis or comparison of each energizing pulse with its corresponding reflected pulse.

There are several disadvantages associated with the use of such probes. Workpiece surfaces which are extremely rough or otherwise exhibit high friction in respect to the probe, are difficult or impossible to inspect with such a probe except by the complete immersion of both the probe and the workpiece within the couplant material. Additional disadvantages of the wet coupling methods are that the couplants are messy, costly, involve risk of corrosion or contamination and usually leave residual traces of the coupling medium.

Diffusion bonded structures are formed with thin wall stiffening members ranging in depth from one to several inches to form a component which is both light in weight and strong. The stiffener sections are difficult to inspect. They are currently inspected by immersion techniques employing focused probes. Multiple scans (1/32 inch increments) on each stiffener section are required at each different bond line level. Side wall reflection from the water-metal interface make inspection difficult if not impossible in many cases. These reflections are caused by the impedance mismatch at the water-metal interface. The noise level is so high in most cases that an adequate inspection cannot be made.

The innovative concept described herein will assure complete inspection of most diffusion bonded or solid stiffener sections in the field with a single rectilinear scan and without the use of water immersion apparatus.

SUMMARY OF THE INVENTION

The present invention discloses an automatic rectilinear motivated ultrasonic probe for non-destructive testing to identify internal defects within a rib section of a workpiece such as structural stiffeners found in high speed aircraft and space vehicles.

The present invention comprises a carriage which is adapted to be movably supported on an upstanding rib member of a workpiece that is to be tested, said carriage includes a plurality of adjustable rollers operably disposed therein for direct contact with the rib member, whereby the probe assembly in its entirety is transported along the longitudinal rib member. Attached to the carriage is a probe mounting bracket having an extended arm portion adapted to movably support an ultrasonic probe means in a position forward of the carriage member whereby oscillating and reciprocating action of the probe means imparts locomotion to the roller equipped carriage. The bracket member in one embodiment is stationary relative to the carriage body while in an alternative arrangement the bracket is attached to the carriage body in such a manner as to provide a side to side rocking action.

However, the probe means in both embodiments is movably attached to the bracket and is oscillated forwardly and rearwardly in a linear direction along the rib of the workpiece. Simultaneously it reciprocates in a vertical direction to the rib of the workpiece. At each cycle the probe member itself comes first to an angular and then into direct planar contact with the flat upper surface of the rib. This creates a locomotive action similar to walking. It, therefore, can be referred to as a walking probe. The probe means comprises a housing block adapted to receive a piston assembly, which has disposed therein the ultrasonic components necessary for recording the imperfections and flaws that might be found during testing of a workpiece.

In order to provide the proper walking action and contact along the rib portion of the workpiece there is provided a locomotive means which includes an electric motor operatively connected to the pivoted housing block by a cam assembly. As this cam is rotated by the motor the block will oscillate back and forth with the probe head being brought into full contact with the rib surface. To provide smooth movement of the probe and carriage, the housing block is permitted to slidably float within a pivoted bracket in a vertical direction. This, together with the spring loaded probe head allows the oscillation of the probe means to walk along the rib rectilinearly with a positive sweeping overlapping surveillance of every inch of the workpiece.

Various well known electronic components, such as oscilloscopes, recording devices, etc., can be operably connected to the rectilinearly transducer assembly for accurate readouts of each workpiece as they are tested.

OBJECTS AND ADVANTAGES OF THE INVENTION

The present invention has for an important object a provision whereby a workpiece having a rib member or members can be tested for imperfections, flaws, and other internal defects without need of coupling liquids, paste, or submersion of the part in a water tank.

It is another object of the present invention to provide a rectilinear acoustical transducer device having locomotive means together with a dry coupling means for the rapid inspection of welds, corrosion and diffusion bonded structures by pulse echo techniques heretofore unobtainable.

It is still another object of the present invention to provide a device of this character wherein the surface finishing is not a prerequisite to the use of said inspection device.

It is a further object of the invention to provide a device of this character that can be complemented by off-the-shelf electronic recording apparatus.

It is still a further object of this invention to provide a device, of this character for inspecting rib sections on a workpiece having electrically driven locomotive means including a probe means having an overlapping walking action along each rib section at an inspection rate of two to five feet per minute.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 4 is an enlarged end view of that shown in FIG. 3;

FIG. 5 is a cross-sectional view taken along line 5—5 of FIG. 2;

FIG. 6 is a sectional view taken somewhat along line 6—6 of FIG. 2;

DESCRIPTION OF THE PREFERRED EMBODIMENT

Figure 1:
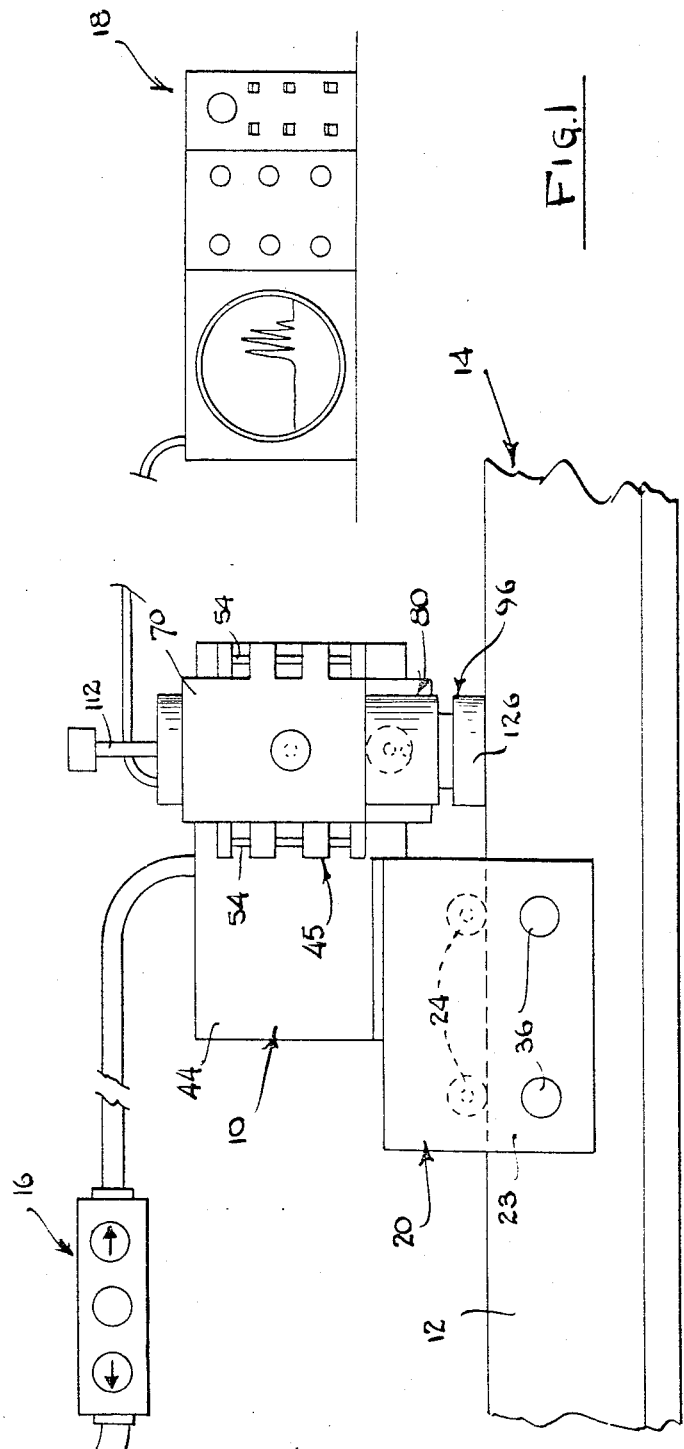
FIG. 1 is a side elevational view of the present invention mounted on a rib section of a workpiece, the device being illustrated with a switch means and a recording apparatus connected thereto.

Referring more particularly to the drawings, there is shown in FIG. 1 an ultrasonic rectilinear acoustical transducer device generally indicated at 10 movably mounted on a rib stiffener section 12 of a structural workpiece 14. This device is operably connected by a switch means and a recording means indicated generally by 16 and 18 respectively. These basic components provide a nondestructive testing system capable of rapid inspection and detection of imperfect welds, corrosion, flaws and various other defects in workpiece, structures, particularly to those structures having rectilinear stiffener rib sections as an integral part thereof.

In order to provide a nondestructive testing device to overcome the past inspection problems, the above present invention comprises, a main carriage indicated generally at 20, formed by two segments 22 and 23 which are secured together to provide a means by which the components of said device are supported for transverse linear movement. To accomplish a free rolling linear movement of the carriage, there is operably disposed therein a roller guide means, said guide means includes a plurality of roller bearings 24 disposed horizontally and a longitudinal channel 26 formed by the oppositely positioned inner walls of segments 22 and 23. Roller bearings 24 are rotatably secured in place by shaft pins 27 mounted within receding holes 28 and 29 of walls 22 and 23 respectively. Channel 26 also defines a longitudinal opening along the entire length of the carriage for reception of rib stiffener 12 as illustrated in FIG. 5. It is essential that the carriage is centrally positioned on the rib or structural stiffener 12 at all times. Since alignment of the inspection tool 10 is critical, there is needed as part of the guide means a plurality of adjustable vertical roller bearings 30 oppositely disposed to each other having adjustable means 32 whereby the roller bearings 30 can be adjusted along a horizontal plane relative to the side faces 34 of the stiffener member 12. The stiffener members vary in widths from 3/16 of an inch to 2 inches and in depths of from 2 and 1/2 to 4 inches with some workpieces weighing from 900 or 1,000 pounds. The adjustable means 32 of the rollers 30 can be accomplished in various suitable ways, but for illustrative purposes said means comprises a threaded lug 36 which is received in threaded holes 38 disposed in each segment 22 and 23 and centrally aligned with oppositely positioned cavities 40, said cavities being interposed in the lower portion of the inner wall of the segments 22 and 23. Received within each cavity 40 is a slidable bracket 42, which is spring biased by a leaf spring 43. Roller bearings 30 are operably coupled within the brackets 42 and are thereby brought into direct vertical contact with faces 34 when lugs 36 are adjusted.

Secured to the carriage 20 along its upper flat surface is a support bracket 44, to which the acoustical transducer probe assembly, generally indicated at 45, is movably mounted. The movement of said probe assembly is such that a back and forth oscillating action is imparted thereto by a locomotive means also attached in a suitable manner to the support bracket 44. Said locomotive means, indicated at 46, imparts movement of said probe which causes a linear walking action to occur to the probe assembly along said rib or stiffener. The details of which will hereinafter be described.

Figure 7:
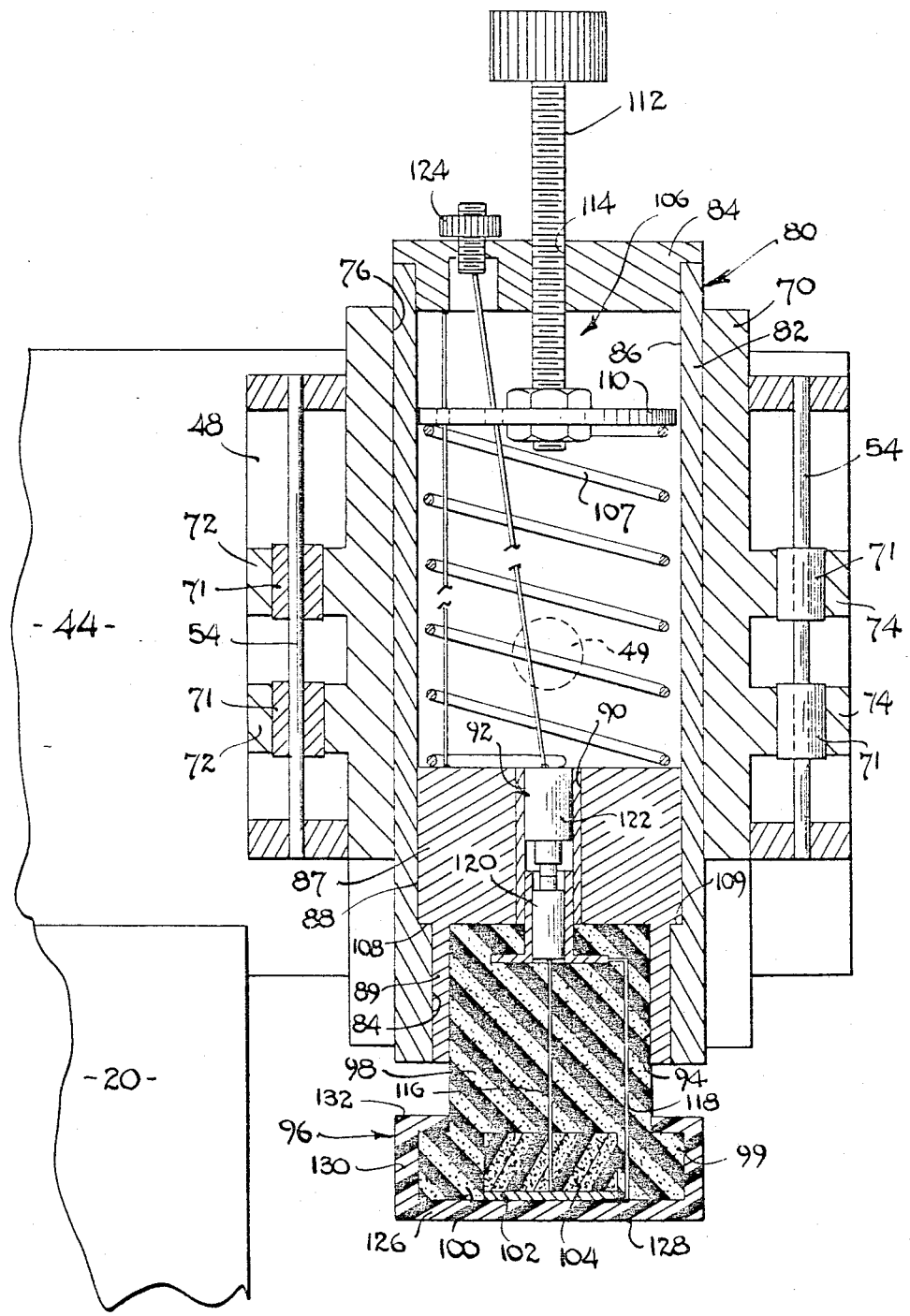
FIG. 7 is an enlarged cross-sectional view of the ultrasonic probe assembly taken along line 7—7 of FIG. 2.

The acoustical probe assembly 45 comprises a pivotable frame 48, pivotably mounted to said support bracket 44 by pivot pin 49 (see FIG. 6). Said frame 48 is provided with a backplate 50 which also is adapted with a central hole 51 for receiving said pivot pin 49. Extending from each outer corner of the backplate 50 is an arm 52, said arm being arranged to form a compatible vertical set of upper and lower arms whereby a stationary rod 54 is fixed therebetween, as seen in FIGS. 4, 5 and 7. The oscillating rocking actions as previously mentioned is directly imparted to the frame member by use of a drive end assembly 56 which is an integral part of the locomotive means. Said locomotive means comprises an electric motor 58 interconnected to a gear assembly or box 60 with an extended output shaft 62, said shaft being disposed within a bore 64 located along the lower edge of bracket 44. There is mounted to the free end of said shaft 62 a concentric wheel 56 having secured thereon an eccentric crank pin 66, said pin being received with bushing 68 disposed in the lower portion of the ultrasonic acoustical probe housing block 70. The location of pivot pin 49 with relationship to crank arm 66 creates an oscillating rectilinear motion of said probe assembly 45.

The probe housing block 70 is slidably mounted to the pivotable frame 48 by means of a plurality of stabilizing bushings 71 fixedly mounted within oppositely arranged pairs of extended flanges 72 and 74. These flanges are an integral part of the probe piston block 70 and, therefore, provide a reciprocating substantially vertical sliding action within frame 48 when said bushings are slidably supported on the vertical stationary rod 54. These can be seen in the section view of FIG. 7 as well as FIGS. 4 and 5.

Thus, the various movements and actions are important to the proper functioning of the probe and will hereinafter be described in more detail.

Said probe housing block 70 is provided with a vertical bore 76 in which there is fixedly interposed therein an ultrasonic probe means, generally indicated at 80, said means includes a cylindrical piston housing 82 closed at its upper end by cap 84 and opened at its lower end by a reduced diameter bore 85. Slidably received in an enlarged bore 86 of the piston housing 82 is piston member 87 defined by an enlarged head 88 and a reduced diameter lower neck portion 89. The enlarged head having substantially the same diameter as bore 86 and neck portion 89 having substantially the same diameter of the reduced housing bore 84 (see FIG. 7). Included in the piston head 88 is a small vertical bore 90 in which is received electrical connecting means, generally indicated at 92. Adjacent the inner end of bore 90 and communicating therewith is enlarged cavity 94 disposed in neck portion 89 whereby an acoustical probe head, indicated by numeral 96, is removably positioned therein. The probe head 96 is adapted with a mating part of the electrical connecting means 90. However, it will be appreciated that various suitable electric connector means can be used to provide the required positive electrical connection between the probe head and various power circuitries of any commercial available pulse echo, visually interpreted ultrasonic test equipment, and/or alarm recording systems for high speed inspection.

The probe head 96 is comprised of a main solid cylinder like body 98 having an outer diameter at least equal to the inside diameter of cavity 94 in which said body is removably disposed. Extending below the body 98 is an annular flange 99 providing an enlarged area which will be referred to as foot 100. Said probe head 96 is formed of substantially resilient rubber like material and comprises a silicon material filled with powdered metal to provide additional acoustical damping and an adequate impedance match with the loaded epoxy backing 104 on the piezoelectric segment 102 which is fixedly disposed within the foot portion 100. This combination provides for the proper flexible, mechanical support as well as an acoustical damping means for the extremely thin piezoelectric segment 102, to which a backing member 104 is bonded, said backing member being formed of a substantially hard material, it has been found that a combination of epoxy and tungsten powder is quite satisfactory in providing acoustical match and damping of the mechanical stress of piezoelectric segment 102. It, therefore, can be appreciated that member 104 in addition prevents fractures of the crystal like segment 102 when in an operating mode. Both the crystal element 102 and its associated backing member is allowed to freely move within probe head 96 since said material thereof is sufficiently resilient to permit the piezoelectric element to depress slightly within the material as the probe is brought into press contact with the rib of the workpiece.

Due to the rectilinear walking action imparted to the probe means there is also included an adjustable shock absorbing means indicated generally at 106, which permits the probe head 96 along with the piston member 87 to retract somewhat within the piston housing as the probe is pressed against the workpiece and then conversely as the probe is lifted away from the workpiece spring 107 forces the probe head outwardly until shoulder 108 of the piston 87 engages the inwardly extending annular shoulder 109 of the piston housing 82. Said spring 107 is disposed in bore 86 of the housing 82 having one end engaged against the piston member 87 and the opposite end thereof engaged under disc 10 which is slidably adjustable within bore 86 by means of a threaded adjusting bolt 112, said bolt being threadably received in hole 114 centrally located in cap 84.

The piezoelectric sensing device is electrically connected by wires 116 and 118 to connect plug means 92, more specifically the wires are attached to male plug 120, imbedded within body 98 and is received for electrical connection with female plug 122, which in turn is provided with the necessary wire connection to an externally exposed adapter plug 124. Said plug 124 can be of any suitable type that is adaptable for use with the before mentioned commercial recording devices such as 18 seen in FIG. 1.

In order to provide the above described nondestructive testing device with a dry coupling means for use in place of various wetting agents, there is formed an acoustical dry coupling pad 126. This pad as used in conjunction with foot 100 and is defined as having a cup like configuration of an elastomeric dry coupled material of which will be the subject of its own application. However, this material provides a thixotropic like surface action which results in a very low pressure dry coupled contact to the test article. Due to said material the need of a very smooth inspection surface is no longer required, therefore, rapid inspection of extremely rough surface structures without removing the component from an aircraft is now possible. Thus, surface finishing is not a prerequisite to inspection process with use of said thixotropic like material of cap 126. The cap as used with the instant invention comprises a relatively flat surface circular face member 128 having an upright annular integral wall 130, said wall being formed with an inwardly projecting flange 132. Since said cap comprises a flexible elastic material it then becomes very readily removable or interchangeable depending on the composition to be tested.

WALKING AND SCANNING OPERATION

The following is a description of the various elements previously described so that a better understanding of the rectilinear action can be understood.

Figure 8:
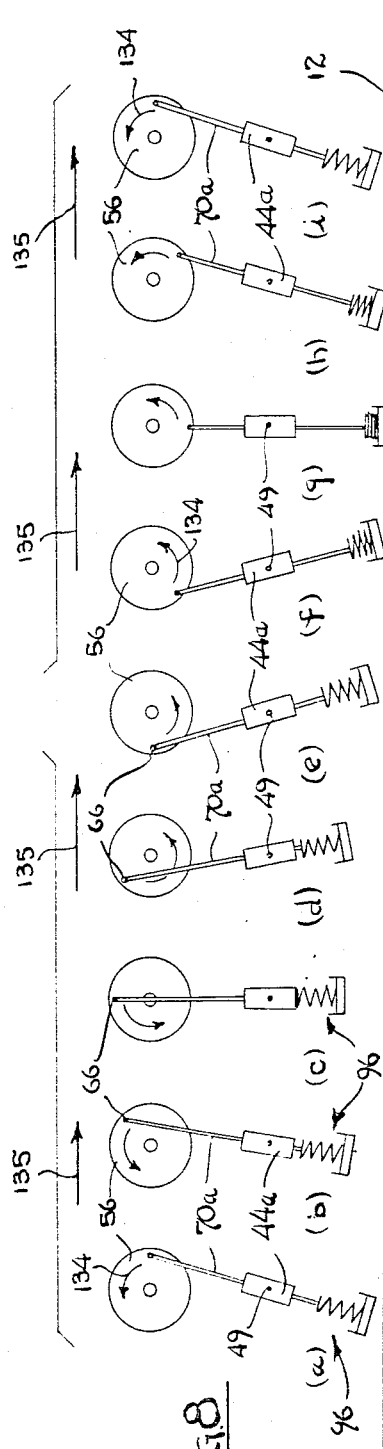
FIG. 8 is a diagramatic illustration of the walking action which creates the motivated transverse movement of the device along the rib section of a workpiece.
Figure 2:
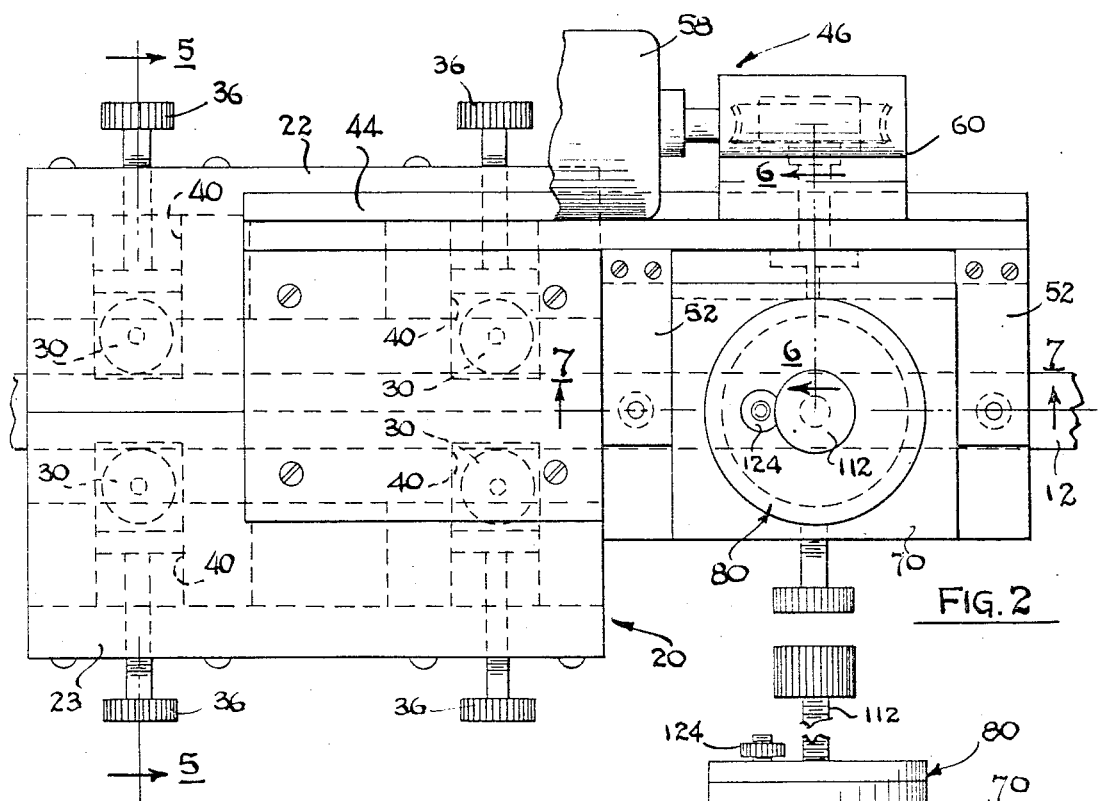
FIG. 2 is an enlarged top planned view of the device.
Figure 3:
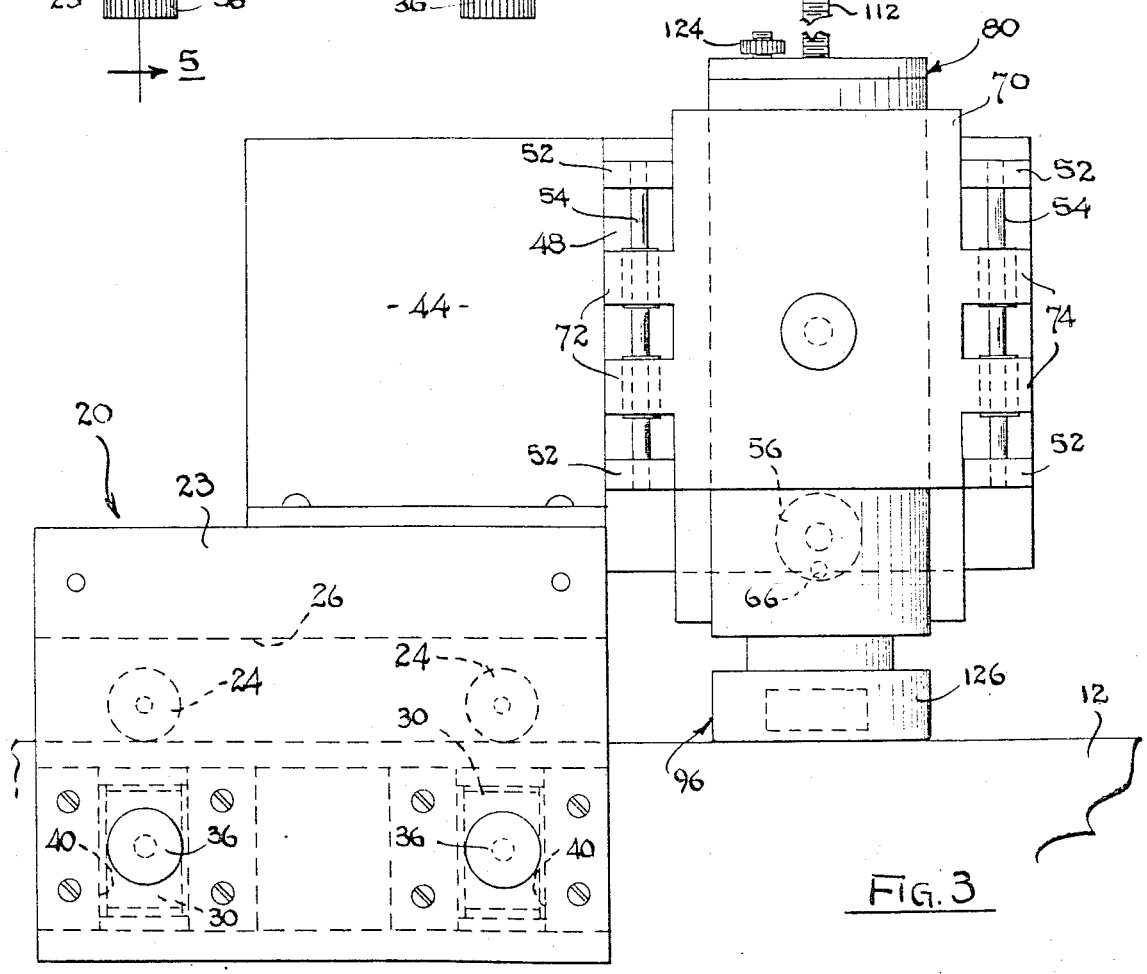
FIG. 3 is an enlarged side elevation of the invention with the probe in full contact with the rib member.

Thus referring back to the drive pin assembly 56 which is driven by the motor 58 in either a clockwise or counterclockwise direction, and is illustrated by arrows 134 in FIG. 8 as a counterclockwise motion wherein the counterclockwise action thereof produces a left to right linear movement to said acoustical device 10 indicated by arrows 135.

Drive pin 66 which is eccentrically secured to wheel 56 is suitably journalled in the probe housing 70 to cause said housing to simultaneously oscillate back and forth and to reciprocate in an up and down vertical action creating a compound movement of the probe assembly. This reciprocating action is in turn permitted by the sliding action of housing 70 within the frame 48, same frame being pivotally mounted to the stationary bracket 44. The above walking action can be more readily seen in FIG. 8 in which 44a represents 44, and 70a represents housing 70. Pivot pin 49 and frame 48a are shown stationary in both a vertical and horizontal plane, said frame only moving about pin 44a in a back and forth motion. However, it also can be seen that 70a oscillates with 44a but in addition reciprocates up and down therein due to 70a being journalled to pin 66 of wheel 56.

Position (a) illustrates the probe head assembly 96 separating from rib workpiece 12, said assembly 96 is prevented from coasting forwardly along said rib in positions (b) through (e) by built in function. When said probe head assembly makes pressure contact with the workpiece for ultrasonic scanning thereon through positions (f), (g) and (h), it walks forward along said rib one step. Position (i) begins another cycle. The distance of forward travel between one contact point to the succeeding contact point of the head 96 may be adjusted by the radial location of drive pin 66 in cam wheel 56 and for the location of pivot pin 49. The mechanical arrangement of embodiments 1 and 2 provide a step of approximately 3/8 of an inch with the linear travel of the device 10 along the workpiece at a speed rate of two to five inches per minute. It is important to note at this time that workpieces previously required twelve hours to be inspected may now be automatically inspected in less than one hour and without the use of a liquid tank or contaminating couplant.

Figure 9:
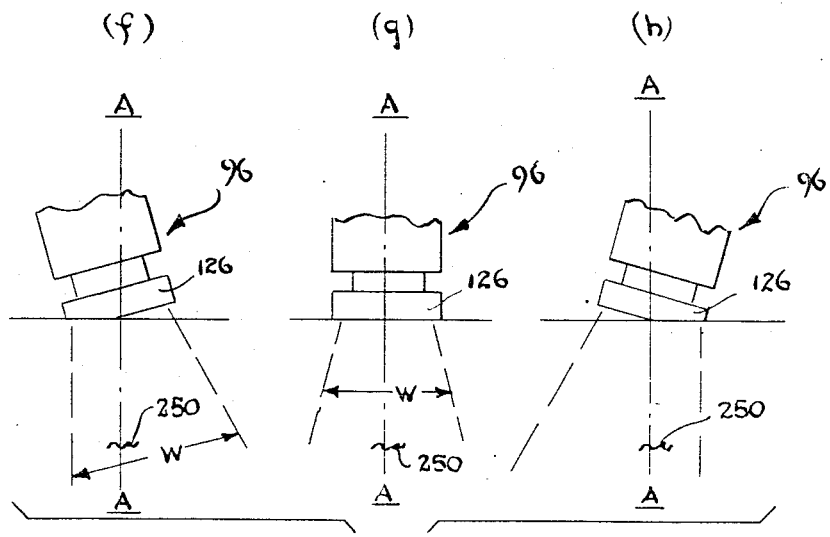
FIG. 9 is a diagramatic illustration of the specific scanning capabilities of a single walking contact over a defective area.

In order to more specifically illustrate the wide scanning range in which a flaw or imperfection is located, positions (f), (g) and (h) are shown enlarged in FIG. 9. Position (f) of the probe head 96 begins a sequential scanning action similar to the movement of a foot, that is, heel to toe motion wherein (f) position represents the heel contact, (g) position the sole contact and (h) position represents the toe contact. During this progressive movement it can be seen that the scanning width (w) is such that if a flaw 250 is within the scanning area (w) and it will remain within the scanning scope through the three positions (f), (g), and (h) as the probe rotates through center line a—a. FIG. 9 is drawn to illustrate the scanning effect only. The angles involved are small. The surface of the piezoelectric discovered with an elastic dry couple cap 126 (not shown in FIG. 9) this cap and the rubber foot distort with the angular movement providing a complete acoustical couple not evident in the illustration. Therefore, each step is regulated to approximately a 3/8 inch movement from each succeeding center line. Thus an overlapping acoustical beam scanning condition occurs thereby virtually eliminating the possibility of missing a flaw or defect within the workpiece being inspected.

Figure 10:
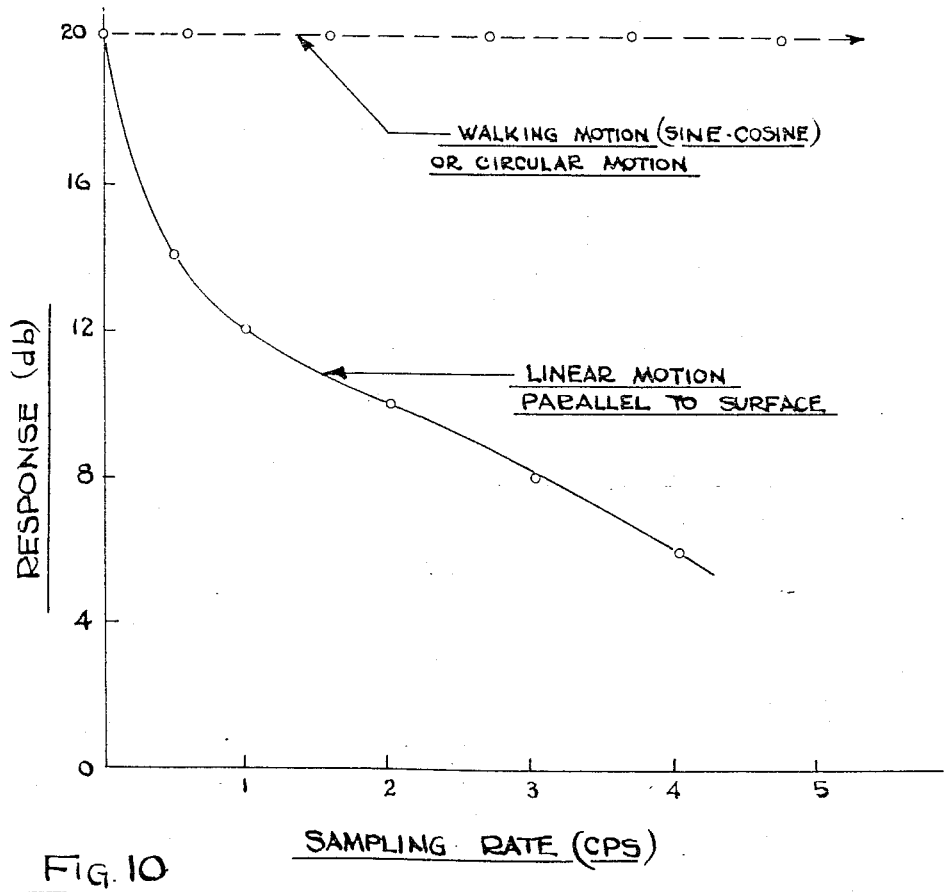
FIG. 10 is a diagram showing the comparison of the (db) response between a walking motion and an up and down linear motion.

An additional important factor of the walking action of probe head 96 should also be considered at this time, i.e., the dry couplant 126 progressively forms a direct contact with the surface of the rib such that as it progressively rocks forwardly about the axis a—a all minute air pockets are in essence squeezed out from under the face member 128 whereby a dynamic coupling will exist between the workpiece surface and the dry couplant material. To better illustrate the enhanced results from a positive walking action over that of an action in which the probe is brought into contact with the workpiece by a direct up and down vertical action, refer to FIG. 10. Hence, it can be readily seen that the walking motion indicated as dotted lines has a very high even response compared to other linear motions. As a typical example of the end result that can be expected from said walking motion, refer to FIG. 11 which illustrates a scaled recording of a workpiece formed from titanium having a 3 1/4 inch metal path using a 1/2 inch by 1/2 inch transducer. This workpiece was found to have three flaws in its structure, one being a 4/64 inch diameter hole and two 3/64 inch diameter holes, one of which was at a 2 degree angle as indicated on the diagram. Each flaw is indicated several times on the recording (one pulse for each of 2 or 3 steps). The recording thus effectively illustrates the mechanical and acoustical beam scanning action obtained with the walking transducer assembly.

ALTERNATIVE EMBODIMENT

Figure 12:
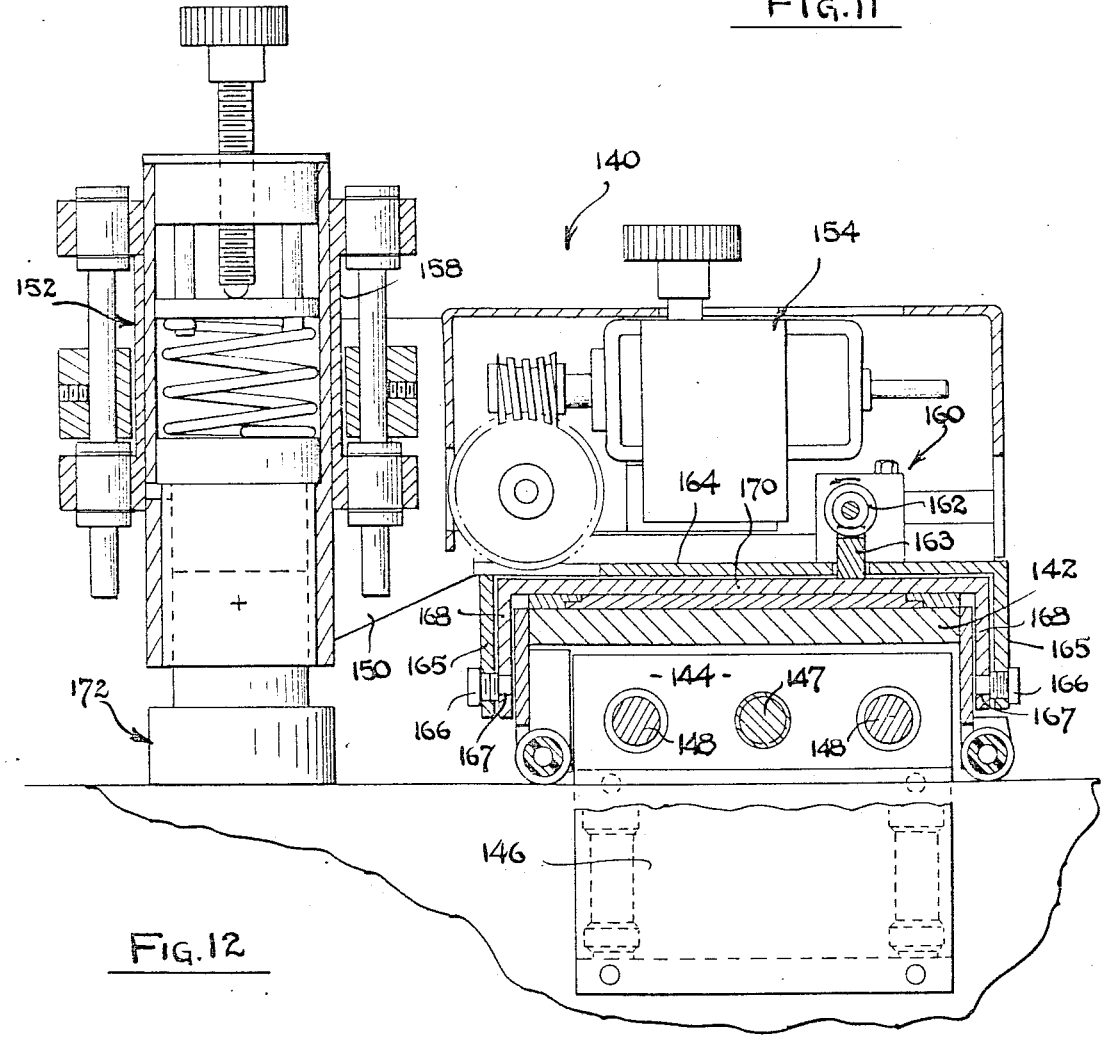
FIG. 12 is a partial sectional view of an alternative embodiment of the rectilinear transducer assembly.

Referring to the alternative embodiment, as shown in FIG. 12, there is included therein the major components as hereinbefore described in the preferred device. The major components are hereby indicated in FIG. 12, wherein the acoustical transducer device is generally indicated by reference character 140 having a main carriage 142 with oppositely disposed adjustable sidewalls 144 and 146, the carriage and walls being adapted with roller means for linear movement and support of device 140 when positioned on a workpiece to be inspected. An adjustable means is provided for movement of the sidewalls, said adjustable means comprises a bolt 147 centrally located between walls 144 and 146, wherein the bolt is provided with right and left hand threads (not shown) similar to a turnbuckle, so that each sidewall is capable of being adjusted inwardly and outwardly in unison. In addition, the walls are held in parallel slidable relationship through the use of transverse guide pins 148, which are fixedly secured to carriage 144. Thus, said walls 144 and 146 are permitted to slide transversely along the pins 148 when said bolt 147 is rotated.

Figure 11:
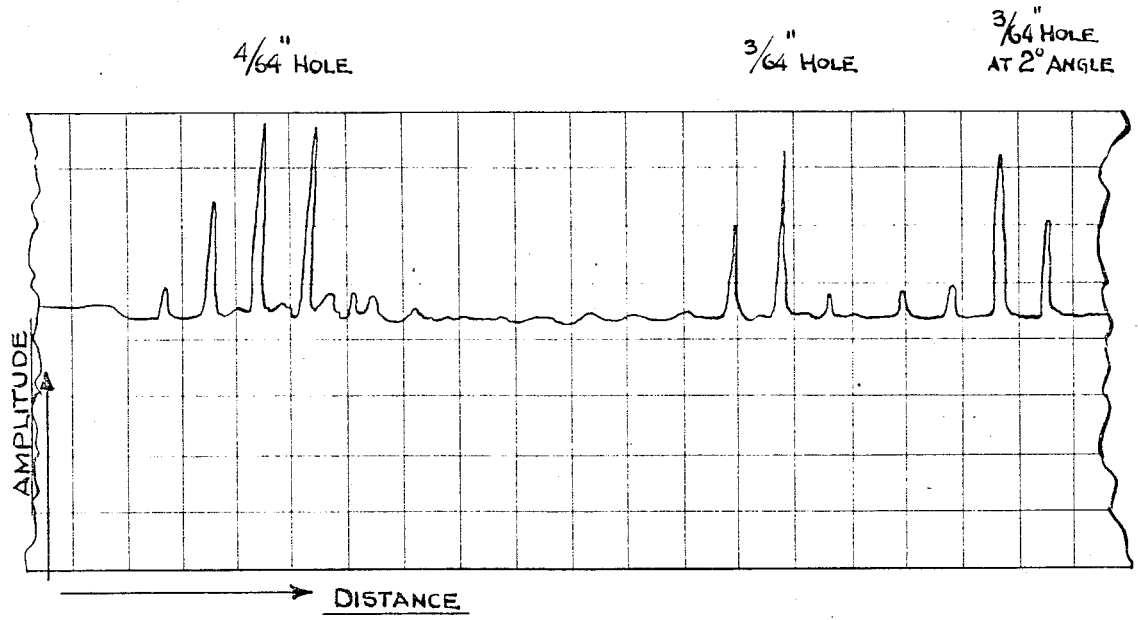
FIG. 11 is a diagram illustrating one means of recording the flaws and defects within a structural workpiece.

As in the first embodiment there is support bracket 150, said bracket being adapted to movably support the acoustical transducer assembly, generally indicated at 152, and fixedly support the locomotive means indicated by reference character 154. Said transducer assembly comprises the basic elements of a pivotable frame 156 movably attached to said support bracket 150 and having slidably mounted therein probe body housing 158. A walking action is imparted to said assembly 152 in a similar manner as described in the original embodiment and as shown in FIG. 8. However, the differences between the first embodiment and the second embodiment is the additional element whereby the probe assembly 152 can be adjustable to various angles relative to the linear travel of the device 140. That is, bracket 150 through an adjustment of an angle adjusting means 160 can be moved in an arc about carriage 142. Said angle adjusting means 160 includes a worm gear 162 and matching angular rack segment 163 which has the capability of being fixedly adjusted to provide a predetermined angle of attack by the probe assembly 152. Hence this will permit a larger area to be covered when the thickness of a rib section is larger than the scanning area W. Under various scanning conditions that might be required the adjusting means is also capable of being interconnected to the locomotive means, whereby the probe assembly will oscillate together with bracket 150 transversely to that of the longitudinal axis of travel by the testing device 140. It will, therefore, simultaneously oscillate between 0° and 2° as the walking action along the longitudinal curve occurs. The overall movement having an approximate pivot action of 4°, that is, two degrees to the left of the axis and 2° to the right of the axis of travel. A 2° recording is shown in FIG. 11, wherein a 3/64 hole is recorded at a two degree angle setting of the probe.

Bracket 150 is secured to a pivotable platform 164 having depending end flanges 165 in which pivot pins 166 are mounted, said pins being adapted to be received in opening 167 found in depending flanges 168 of a substantially fixed slide plate 170 which is slidably affixed to said carriage 142. Thus, brackets 150 is oscillated by an operating means comprising a worm gear 162, which is secured to the pivotable platform 164 and operably connected to rack 163 which is fixedly secured to slide plate 170. The slide plate 170 is permitted to be adjusted when alignment of the probe head 172 is to be accurately located on the rib surface.

The invention and its attendant advantages will be understood from the foregoing description and it will be apparent that various changes may be made in the form, construction and arrangement of parts of the invention without departing from the spirit and scope thereof or sacrificing its material advantages, the arrangement hereinbefore described being merely by way of example, and I do not wish to be restricted to the specific forms shown or uses mentioned, except as defined in the accompanying claims.

1. A rectilinear acoustical transducer inspection device for non-destructive testing of a rib section on a workpiece, said device comprising:
   a carriage;
   a roller guide means operably supported by said carriage;
   adjustable means for adjusting said roller guide means to provide direct contact with said rib section;
   an acoustical transducer probe assembly operably attached to said carriage;
   locomotive means operably connected to said probe assembly for imparting a linear walking action to said probe assembly in a step by step contact with and along said rib section;
   a support bracket mounted on said carriage whereby said probe assembly is pivotably supported at the forward end thereof; and
   means removably secured to said acoustical transducer probe assembly, and
   wherein said acoustical transducer probe assembly comprises:
   a pivotable frame, pivotably mounted to said support bracket;
   a housing block slidably mounted to said pivotable frame and having a vertical central bore disposed therethrough, said block being operably connected to said locomotive means whereby a walking action is imparted thereto; and
   a probe means adjustably secured within said bore of said housing.

2. An inspection device as recited in claim 1 wherein said probe means comprises:
   a piston housing;
   a piston member slidably received within said piston housing; and
   a probe head removably attached to said piston member.

3. An inspection device as recited in claim 2 wherein said probe head includes:
   a piezoelectric segment mounted therein.

4. An inspection device as recited in claim 3 wherein said probe head comprises:
   a solid cylinder body having an enlarged annular foot, said body being formed of substantially resilient material;
   a powdered metal interspersed throughout said body; and
   a biasing means disposed within said piston housing and forcing said probe means outwardly therefrom.

5. An inspection device as recited in claim 4 wherein said piezoelectric segment includes:
   a backing member secured to one side of said piezoelectric segment wherein both are fixedly disposed within said foot.

6. An inspection device as recited in claim 5 wherein said backing comprises:
   a substantially hard epoxy material; and
   a powdered metal interspersed therethrough.

7. An inspection device as recited in claim 6 wherein said powdered metal comprises:

a tungsten powder.

8. An inspection device as recited in claim 7 wherein said dry coupling means comprises:
- an elastomeric flexible cap wherein said foot of said probe head is covered thereby providing a low pressure contact between said probe and said workpiece.

9. An inspection device as recited in claim 8 wherein said locomotive means comprises:
- an electric motor;
- a gear assembly interconnected to said motor;
- a concentric wheel operably driven by said gear assembly; and
- a crank pin eccentricly mounted to said concentric wheel, said pin being operably received in said housing block.

10. An inspection device as recited in claim 3 wherein said device includes:
- a recording means operably connected to said device and remotely positioned therefrom.

11. An inspection device as recited in claim 10 including:
- means for electrically interconnecting said probe head to said recording means.

12. An inspection device as recited in claim 10 wherein the direction of linear movement of said device is controlled by a switch means operably connected thereto.

13. An inspection device as recited in claim 3 wherein said device includes:
- a pivotable platform movably mounted to said carriage and having said bracket supportingly fixed thereto whereby said acoustical transducer probe is oscillated transversely to the rib section of the workpiece; and
- an operating means interconnecting said locomotive means with said pivotable platform.

* * * * *